US012633003B2

(12) United States Patent
Min et al.

(10) Patent No.: US 12,633,003 B2
(45) Date of Patent: May 19, 2026

(54) VIDEO GENERATION WITH LATENT DIFFUSION PROBABILISTIC MODELS

(71) Applicant: NEC Laboratories America, Inc., Princeton, NJ (US)

(72) Inventors: Renqiang Min, Princeton, NJ (US); Kai Li, Plainsboro, NJ (US); Hans Peter Graf, South Amboy, NJ (US); Haomiao Ni, State College, PA (US)

(73) Assignee: NEC CORPORATION, Tokyo (JP)

( * ) Notice: Subject to any disclaimer, the term of this patent is extended or adjusted under 35 U.S.C. 154(b) by 278 days.

(21) Appl. No.: 18/462,703

(22) Filed: Sep. 7, 2023

(65) Prior Publication Data

US 2024/0087179 A1 Mar. 14, 2024

Related U.S. Application Data

(60) Provisional application No. 63/424,154, filed on Nov. 10, 2022, provisional application No. 63/419,054, filed on Oct. 25, 2022, provisional application No. 63/404,976, filed on Sep. 9, 2022.

(51) Int. Cl.
*G06T 11/00* (2026.01)
*G06T 3/18* (2024.01)
*G06V 20/40* (2022.01)

(52) U.S. Cl.
CPC ................ *G06T 11/00* (2013.01); *G06T 3/18* (2024.01); *G06V 20/46* (2022.01)

(58) Field of Classification Search
CPC ............ G06T 11/00; G06T 3/18; G06V 20/46
See application file for complete search history.

(56) References Cited

U.S. PATENT DOCUMENTS

| | | | |
|---|---|---|---|
| 2019/0096125 A1* | 3/2019 | Schulter | G05D 1/0088 |
| 2023/0377099 A1* | 11/2023 | Kreis | G06N 3/0475 |
| 2024/0155148 A1* | 5/2024 | Racape | H04N 19/132 |

OTHER PUBLICATIONS

Siarohin et al., "First Order Motion Model for Image Animation", Advances in Neural Information Processing Systems 32 (NeurIPS 2019), pp. 1-11 (Year: 2019).*
Jonathan Ho et al., 'Video Diffusion Models', arXiv:2204.03458v2, Jun. 2022 [retrieved on Dec. 19, 2023]. Retrieved from ‚https://arxiv.org/abs/2204.03458v2. pp. 2-4, 9 (Year: 2022).*
Zhikang Wang et al., 'Feature Erasing and Diffusion Network for Occluded Person Re-Identification', arXiv:2112.08740v1, Dec. 2021 [retrieved on Dec. 19, 2023]. Retrieved from ‚https://arxiv.org/abs/2112.08740v1> section 1,3 (Year: 2021).*
Jain et al., "Denoising Diffusion Probabilistic Models", Advances in Neural Information Processing Systems 33 (NeurIPS 2020), pp. 1-12 (Year: 2020).*

(Continued)

*Primary Examiner* — Michael Le
(74) *Attorney, Agent, or Firm* — Vincent Duffy; Joseph Kolodka

(57) ABSTRACT

Methods and systems for training a model include training an encoder in an unsupervised fashion based on a backward latent flow between a reference frame and a driving frame taken from a same video. A diffusion model is trained that generates a video sequence responsive to an input image and a text condition, using the trained encoder to determine a latent flow sequence and occlusion map sequence of a labeled training video.

20 Claims, 7 Drawing Sheets

(56) References Cited

OTHER PUBLICATIONS

Li et al., "Video Generation from Text", In Proceedings of the AAAI conference on artificial intelligence Apr. 27, 2018 (vol. 32, No. 1), pp. 1-8.

Balaji et al., "Conditional GAN with Discriminative Filter Generation for Text-to-Video Synthesis", In IJCAI Aug. 10, 2019 (vol. 1, No. 2019), pp. 1-23.

Jonathan Ho et al., 'Video Diffusion Models', arXiv:2204.03458v2, Jun. 2022 [retrieved on Dec. 19, 2023]. Retrieved from <https://arxiv.org/abs/2204.03458v2> pp. 2-4, 9.

Zhikang Wang et al., 'Feature Erasing and Diffusion Network for Occluded Person Re-Identification', arXiv:2112.08740v1, Dec. 2021 [retrieved on Dec. 19, 2023]. Retrieved from <https://arxiv.org/abs/2112.08740v1> section 1, 3.

* cited by examiner 710    720    730    740

712    722    732    742

Latent diffusion model
106

VIDEO GENERATION WITH LATENT DIFFUSION PROBABILISTIC MODELS

This application claims priority to U.S. Patent Application No. 63/404,976, filed on Sep. 9, 2022, to U.S. Patent Application No. 63/419,054, filed on Oct. 25, 2022, and to U.S. Patent Application No. 63/424,154, filed on Nov. 10, 2022, incorporated herein by reference in their entirety.

BACKGROUND

Technical Field

The present invention relates to video generation and, more particularly, to the use of diffusion models in video generation.

Description of the Related Art

While generative models have had great success in generating static images, generating videos is more difficult due to the additional temporal dimension. For example, it may be challenging to preserve spatial details while keeping temporal coherence across generated frames of a video.

SUMMARY

A method for training a model includes training an encoder in an unsupervised fashion based on a backward latent flow between a reference frame and a driving frame taken from a same video. A diffusion model is trained that generates a video sequence responsive to an input image and a text condition, using the trained encoder to determine a latent flow sequence and occlusion map sequence of a labeled training video.

A system for training a model includes a hardware processor and a memory that stores a computer program. When executed by the hardware processor, the computer program causes the hardware processor to train an encoder in an unsupervised fashion based on a backward latent flow between a reference frame and a driving frame taken from a same video. A diffusion model is trained to generate a video sequence responsive to an input image and a text condition, using the trained encoder to determine a latent flow sequence and occlusion map sequence of a labeled training video.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Conditional latent diffusion models may be used for text-conditioned video generation. Video generation may be decomposed into spatial content transformation and temporal dynamics generation. Thus, a two-stage training may be used for a video generation model to reduce the complexity of generation and computation. In one stage, an image encoder and decoder may be learned with video frames being mapped into continuous latent embeddings. In a second stage, a conditional latent diffusion probabilistic model may be learned over the concatenated continuous latent embeddings of video frames, conditioned on input text and optionally the latent embedding of a given image. The latent flow diffusion model may be trained on datasets with paired text-video data. During inference, only the input text and optionally an input image need to be provided, with the latent diffusion probabilistic model generating a sequence of latent video frame embeddings conditioned on the encoded input feature embeddings. The video frame embeddings are then used to generate a video.

In some cases, the generated video may synthesize a human activity corresponding to the input text and image. In such embodiments, a first stage may learn an image encoder, decoder, and flow predictor without annotations, based on self-supervised learning and driving image reconstruction. In a second stage, feature flow diffusion models may be learned with the predicted flow from the first stage, and reverse diffusion learning may be performed, conditioned on encoded feature embeddings of input text and subject image. The feature flow diffusion model may be trained on datasets with paired text-video data. During inference, the feature flow diffusion model may generate feature flow sequences conditioned on encoded input feature embeddings. The produced feature flow sequences may then be used to warp the subject image feature vector to generate target image feature vector sequences, which a learned decoded uses to generate a video.

Figure 1:
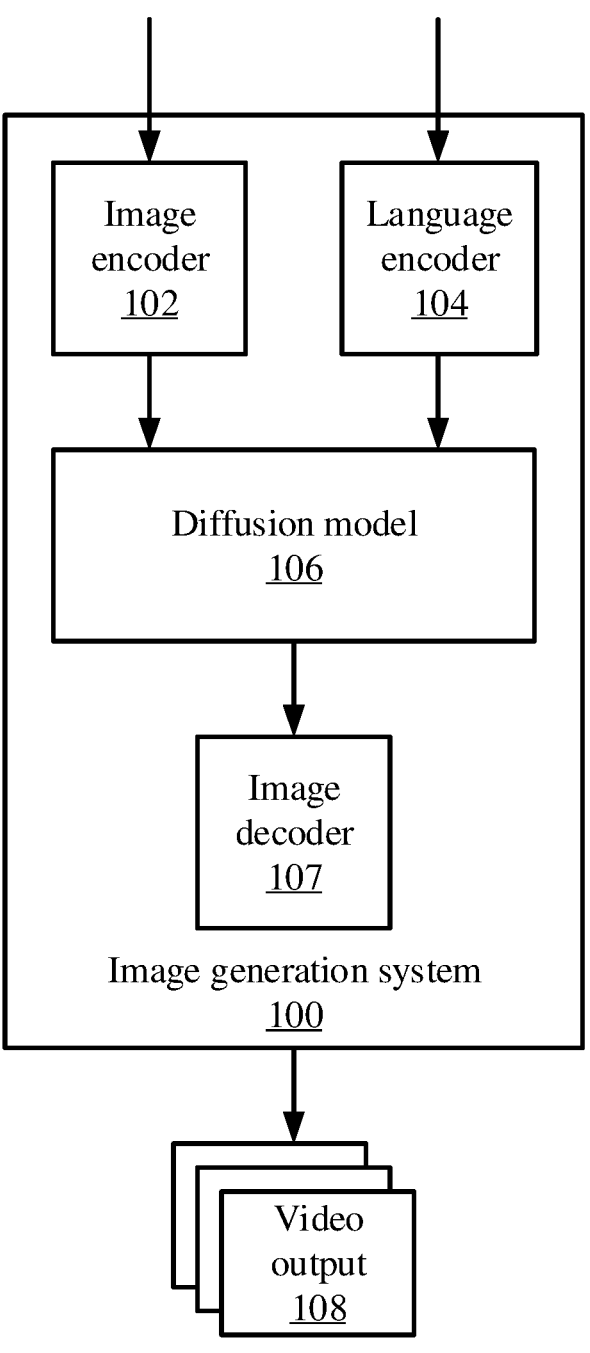
FIG. 1 is a block diagram of a text-conditioned video generation system, in accordance with an embodiment of the present invention.

Referring now to FIG. 1, an image generation system 100 is shown. During operation, the image generation system 100 accepts as input an image and a text condition. The condition may include a natural language expression that identifies a particular characteristic or activity that output video 108 should match. For example, the image input may include a picture of a human being, and the text condition input may include a description of an activity that the human is to perform in the output video 108.

The input image is processed by an image encoder 102, generating a representation of the input image in a first latent space. The text condition is processed by a language encoder, which generates a representation of the input text condition in a respective second latent space. These representations are used as inputs to a latent flow diffusion model (LFDM) 106. The LFDM 106 in turn generates a series of images that make up an output 108 which satisfies the input text condition.

Thus, given a single input image $x_0$ and a condition y, the image generation system 100 synthesizes a realistic video with frames $$\hat{x}_0^K = \{x_0, \hat{x}_1, \ldots, \hat{x}_K\},$$

where K is the number of frames in the output video 108. The LFDM 106 synthesizes a latent optical flow sequence, conditioned on y, to warp the image $x_0$ in the latent space to generate new videos. The spatial content of a given image can be consistently reused by the warp-based LFDM through the temporally coherent flow.

The diffusion produces an occlusion map sequence $$\hat{m}_1^K$$

and a latent flow sequence $$\hat{f}_1^K.$$

The input image $x_0$ is warped with $$\hat{m}_1^K$$

and $$\hat{f}_1^K$$

in the latent space frame-by-frame to generate the output video $$\hat{x}_1^K.$$

By warping the given image $x_0$, instead of basing each frame on its prior frame, artifact accumulation can be avoided. After the encoded representation of the input image is warped in the latent space, for example based on the output of the diffusion model 106, a video decoder 107 can be used to generate the video output 108. The decoder 107 reconstructs a driving frame from the final warped latent map.

To that end, n~ $\mathcal{N}$ (0, I) be a Gaussian noise volume with the shape $K_n \times H_n \times W_n \times C_n$, each quantity representing a length, height, width, and channel number respectively. Given a starting image $x_0$ and condition y, the real video of condition y is $$x_0^K = \{x_0, x_1, \ldots, x_K\},$$

and the goal of conditional image-to-video generation is to learn a mapping that converts the noise volume n to a synthesized video $$\hat{x}_1^K,$$

so that the conditional distribution of $$\hat{x}_1^K$$

is identical to the conditional distribution of $$x_1^K$$

given $x_0$ and y. Thus, $$P(\hat{x}_1^K | x_0, y) = p(x_1^K | x_0, y).$$

Only the class label need be considered as the input condition y.

The LFDM 106 may be based on denoising diffusion probabilistic models (DDPMs). Given a sample from the data distribution $s_0 \sim q(s_0)$, the forward process of the DDPM produces a Markov chain $s_1, \ldots, s_T$ by progressively adding Gaussian noise to $s_0$ according to a variance schedule $\beta_1, \ldots, \beta_T$:

$$q(s_t | s_{t-1}) = \mathcal{N}(s_t; \sqrt{1 - \beta_t}\, s_{t-1}, \beta_t I)$$

where variances $\beta_t$ are held constant. When $\beta_t$ are small, the posterior $q(s_{t-1} | s_t)$ can be approximated by a diagonal Gaussian. If the T of the chain is long enough, then $s_T$ can be approximated by a standard Gaussian $\mathcal{N}$ (0, I). These suggest that the true posterior $q(s_{t-1} | s_t)$ can be estimated by $p_\theta(s_{t-1} | s_t)$, defined as:

$$p_\theta(s_{t-1} | s_t) = \mathcal{N}(s_{t-1}; \mu_\theta(s_t), \sigma_t^2 I)$$

where variances $\sigma_t$ are also constants and T is the total number of time steps of adding Gaussian noise.

The DDPM reverse process, also referred to herein as sampling, produces samples $s_0 \sim p_\theta(s_0)$ by starting with Gaussian noise $s_T \sim \mathcal{N}$ (0,I) and gradually reducing noise in a Markov chain of $s_{T-1}, s_{T-2}, \ldots, s_0$, with learned $p_\theta(s_{t-1} | s_t)$. To learn $p_\theta(s_{t-1} | s_t)$, Gaussian noise $\epsilon$ is added to $s_0$ to generate samples $s_t \sim q(s_t | s_0)$, then a model $\epsilon_\theta$ is trained to predict $\epsilon$ using the mean-squared error loss:

$$L = \mathbb{E}_{t \sim u(1,T), s_0 \sim q(s_0), \epsilon \sim \mathcal{N}(0,I)}[\|\epsilon - \epsilon_\theta(s_t, t)\|^2]$$

where time step t is uniformly sampled from $\{1, \ldots, T\}$.

The term $\mu_\theta(s_t)$ can be derived from $\epsilon_\theta(s_0, t)$ to model $p_\theta(s_{t-1} | s_t)$. Denoising model $\epsilon_\theta$ may be implemented as a time-conditioned U-Net, with residual blocks and self-attention layers. Time step t may be specified to $\epsilon_\theta$ by a sinusoidal embedding. For conditional generation $s_0 \sim p_\theta$ $(s_0 | y)$, the y-conditioned model $\epsilon_\theta(s_t, t, y)$ can be learned.

5

6

For classifier-free guidance, the condition y in $\epsilon_\theta(s_t, t, y)$ may be replaced by a null label $\varnothing$ with a fixed probability. During sampling, the model output may be generated as:

$$\hat{\epsilon}_\theta(s_t, t, y) = \epsilon_\theta(s_t, t, \varnothing) + g \cdot (\epsilon_\theta(s_t, t, y) - \epsilon_\theta(s_t, t, \varnothing)) \qquad 5$$

where g is a guidance scale.

Figure 2:
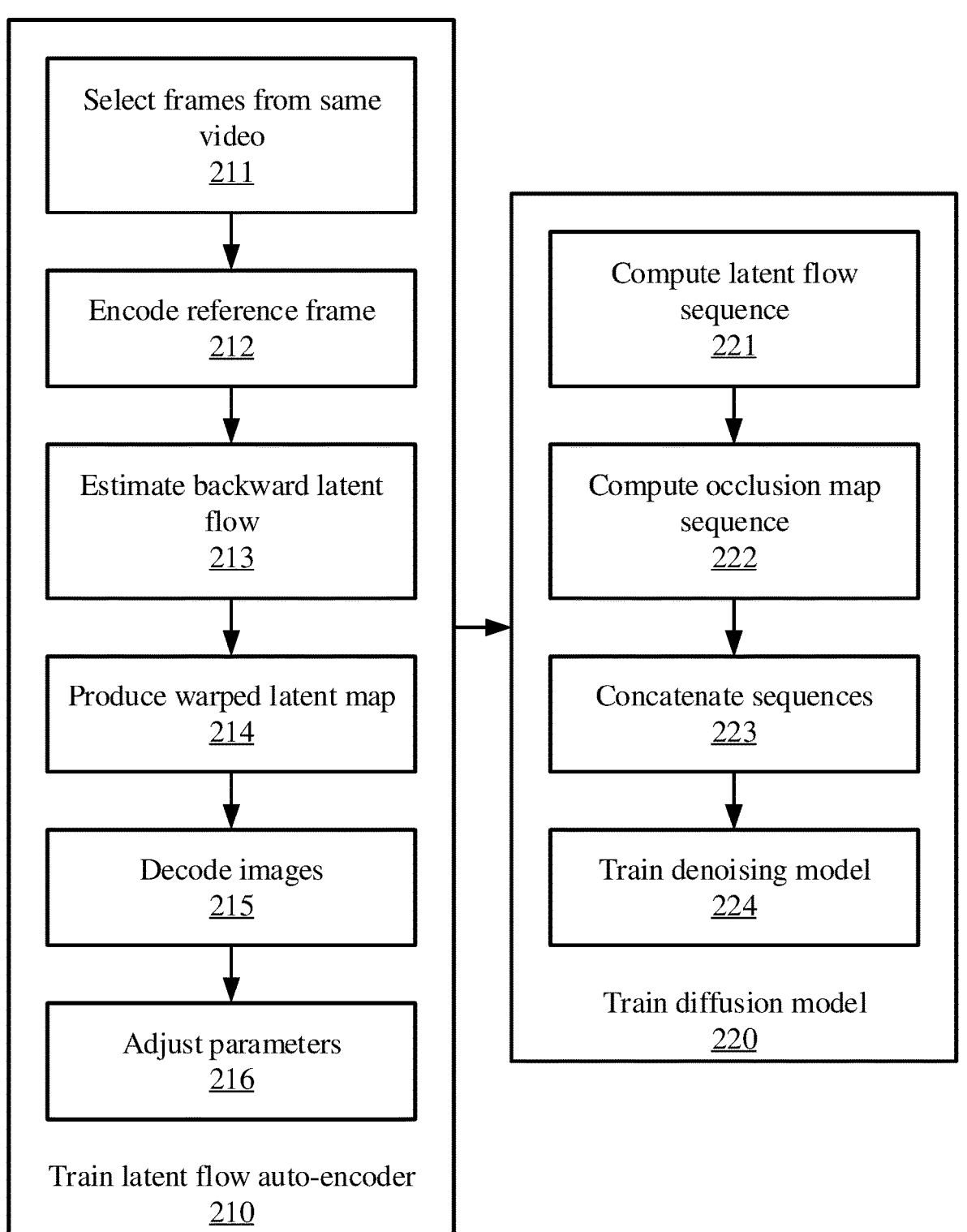
FIG. 2 is a block/flow diagram of a method for training a model of a text-conditioned video generation system, in accordance with an embodiment of the present invention.

Referring now to FIG. 2, a method of training a model for conditioned video generation is shown. The training may include two steps—a first step 210 that trains a latent flow auto-encoder (LFAE) in an unsupervised fashion to estimate latent flow between a reference frame and a driving frame of a video, and a second step 220 that trains a diffusion model using parts of the trained LFAE to produce temporally coherent latent flow sequences conditioned on the input image $x_0$ and a condition class y.

The LFAE may include three trainable parts, including an image encoder $\Phi$ to represent an image x as a latent map z, a flow predictor F to estimate the latent flow f and occlusion map m between video frames, and an image decoder $\Omega$ to decode a warped latent map $\check{z}$ as an output image $\tilde{x}$. Block 211 therefore randomly selects two frames from a same training video, including a reference frame $x_{ref}$ and a driving frame $x_{dri}$. Both $x_{ref}$ and $x_{dri}$ are frames made up of red-green-blue (RGB) pixels and so have a size $H_x \times W_x \times 3$, where $H_x$ is an image height and $W_x$ is an image width.

Block 212 encodes the reference frame $x_{ref}$ using the encoder $\Phi$, generating a latent map z with size $H_z \times W_z \times C_z$, where $H_z$ is the height of the latent map, $W_z$ is the width of the latent map, and $C_z$ is a number of channels for the latent map. Block 213 uses the flow predictor F to estimate a backward latent flow f from $x_{dri}$ to $x_{ref}$ in block 213, which has the same spatial size as the latent map z, but with two channels ($H_z \times W_z \times 2$). The flow has two channels, because it describes the horizontal and vertical movement between frames. Backward flow is used here because it can be efficiently implemented through a differentiable bilinear sampling.

However, only using f to warp z may be insufficient to generate the latent map of $x_{dri}$, because warping can only use existing appearance information in z. When occlusions exist, which are common in videos that include large motions, the LFAE should be able to generate those invisible parts in z. Flow predictor F also estimates a latent occlusion map m with size $H_z \times W_z \times 1$. The occlusion map m includes values from 0 to 1 that indicate a degree of occlusion, where 1 is not occluded and 0 is entirely occluded.

The warped latent map $\check{z}$ can be produced in block 214 as:

$$\check{z} = m \odot \mathcal{W}_{(z, f)}$$

where $\mathcal{W}(\cdot, \cdot)$ is a backward warped map and $\odot$ indicates an element-wise multiplication. The decoder $\Omega$ subsequently decodes the visible parts and inpaints the occluded parts of the latent $\check{z}$ for generating output image $\hat{x}_{out}$ in block 215, which should match the driving frame $x_{dri}$. The LFAE can thereby be trained by minimizing a reconstruction loss using unlabeled video frames:

$$L_{LFAE} = \mathcal{L}_{rec}(\hat{x}_{out}, x_{dri})$$

where $\mathcal{L}_{rec}$ is a loss function measuring the difference between the reconstructed frame $\hat{x}_{out}$ and the ground truth frame $x_{dri}$. An exemplary loss function that can be used is a perceptual loss based on a pretrained visual geometry group (VGG) network. The parameters are updated accordingly in block 216.

In the second stage 220, the diffusion model is trained to synthesize a temporally coherent latent flow sequence. The trained image encoder $\Phi$ and flow predictor F from the first stage 210 are used during the second stage 220. Given an input video $$x_0^K = \{x_0, x_1, \ldots, x_K\}$$

and a corresponding class condition y, block 221 computes the latent flow sequence from frame 1 to frame k as $$f_1^K = \{f_1, \ldots, f_K\}$$

and block 222 computes the occlusion map sequence as $$m_1^K = \{m_1, \ldots m_K\}$$

by applying the trained flow predictor F to estimate $f_i$ and $m_i$ between starting frame $x_0$ and each frame $x_i$, where i=1, ..., K. The size of $$f_1^K$$

and $$m_1^K$$

are $K \times H_z \times W_z \times 2$ and $K \times H_z \times W_z \times 1$, respectively.

Block 223 concatenates $$f_1^K$$

and $$m_1^K$$

along the channel dimension to produce a volume of size $$K \times H_z \times W_z \times 3, s_0 = \text{cat}[f_1^K, m_1^K].$$

Then $s_0$ is mapped to a Gaussian noise volume n by gradually adding three-dimensional Gaussian noise through the DDPM forward process. The encoder $\Phi$ represents starting frame $x_0$ as a latent map $z_0$ and a language model encodes class condition y as text embedding e. The language model may be, for example, a bidirectional encoder representations from transformers (BERT) model.

Conditioned on $z_0$ and e, a denoising model $\epsilon_\theta(s_t, t, z_0, e)$ is trained in block 224 to predict the added noise E in $s_t$ based on a conditional three-dimensional U-Net with a loss of:

$$L_{DM} = \mathbb{E}_{t \sim u(1,T), s_0 \sim q(s_0), \epsilon \sim \mathcal{N}(0,I)}[\|\epsilon - \epsilon_\theta(s_t, t, z_0, e)\|^2]$$

where time step t is uniformly sampled from $\{1, \ldots, T\}$. The denoising model $\epsilon_\theta$ is further used in DDPM reverse sampling to output $$\hat{s}_0 = \text{cat}\left[\hat{f}_1^K, \hat{m}_1^K\right],$$

where $$\hat{f}_1^K = \{\hat{f}_1, \ldots, \hat{f}_K\}$$

and $$\hat{m}_1^K = \{\hat{m}_1, \ldots, \hat{m}_K\}$$

are synthesized latent flow and occlusion map sequences. The expectation in this loss function is over all different randomly sampled time steps, over all different input images $s_0$, and over all different sampled noise vectors. In practice, this can be achieved by stochastic gradient descent through randomly sampling one $s_0$, one time step t, and one noise vector to update the parameters of the denoising model $\epsilon_\theta$.

The latent flow space in the diffusion model is only of size $K \times H_z \times W_z \times 3$, which can be much lower than the RGB pixel space dimensions $K \times H_x \times W_x \times 3$ as long as the spatial size of the latent map is smaller than the image size. Additionally, latent flows only include motion and shape features, so they can be easier to model than latent feature spaces which include other spatial details, such as texture and color.

Figure 3:
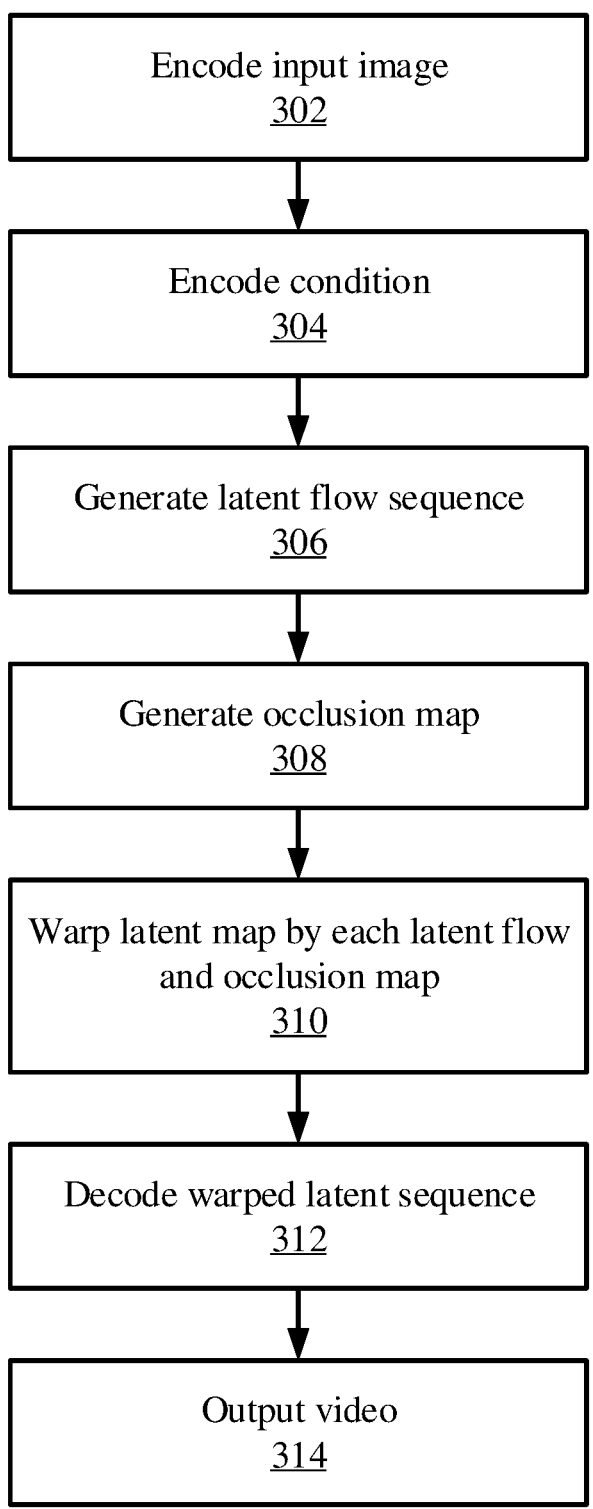
FIG. 3 is a block/flow diagram of a method for generating videos using an input image and a text condition, in accordance with an embodiment of the present invention.

Referring now to FIG. 3, a method of generating a video is shown. Block 302 encodes an input image $x_0$ using the trained encoder $\Phi$, generating a latent representation $z_0$. Block 304 encodes the text condition y using a trained language model to produce embedding e. Conditioned on $z_0$ and e, a randomly sampled Gaussian noise volume n is gradually denoised by $\epsilon_\theta$, through the DDPM reverse sampling, to generate a latent flow sequence $$\hat{f}_1^K$$

in block 306 and an occlusion map sequence $$\hat{m}_1^K$$

in block 308.
Block 310 warps the latent map $z_0$ by each $\hat{f}$ in $$\hat{f}_1^K$$

and each $$\hat{f}_1^K$$

to produce a new latent map sequence $$z_1^K = \{z_1, \ldots, z_K\}.$$

Block 312 then decodes each $\tilde{z}$ in $$z_1^K$$

using the trained image decoder $\Omega$ to synthesize each new frame $\hat{x}$ in an output video $$\hat{x}_1^K.$$

Block 314 outputs the new video. The flow predictor F need not be used during inference.

Figure 4:
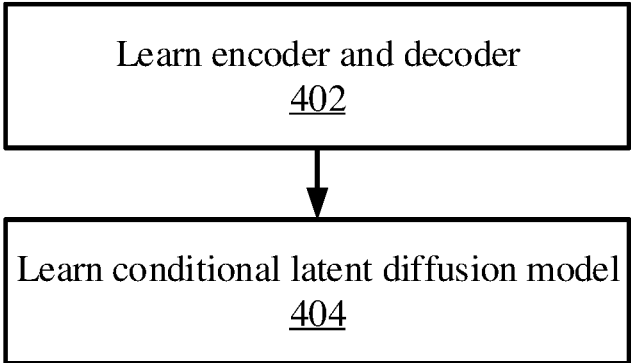
FIG. 4 is a block/flow diagram of a method of training a text-conditioned video generation system, in accordance with an embodiment of the present invention.

Referring now to FIG. 4, a training method is shown. In a first stage 402, an image encoder and decoder are learned based on, e.g., a variational autoencoder-generative adversarial network (VAE-GAN) or style generative adversarial network (StyleGAN) with an inverted encoder. Video frames are mapped into continuous latent embeddings, for example the W+ space of a StyleGAN.

In a second stage 404, a conditional latent diffusion probabilistic model is learned over the concatenated continuous latent embeddings of video frames, conditioned on the input text and optionally the latent embedding of the given image. The latent flow diffusion model may be trained on datasets with paired text-video labels.

Figure 5:
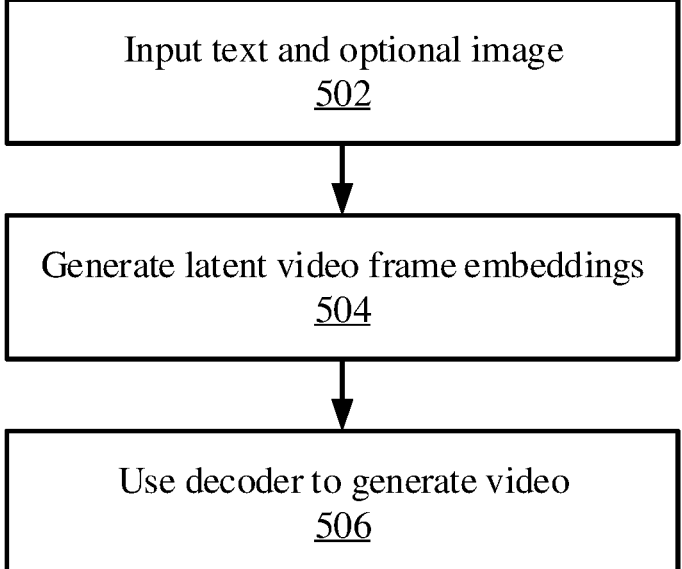
FIG. 5 is a block/flow diagram of a method for generating videos using an input image and a text condition, in accordance with an embodiment of the present invention.

Referring now to FIG. 5, a method for generating a video using a text condition is shown. Block 502 inputs a text condition and optionally an image, generating encoded input feature embeddings. Block 504 uses a latent diffusion probabilistic model, as described above, to generate a sequence of latent video frame embeddings that are conditioned on the encoded input feature embeddings. A decoder is used to process the latent video frame embeddings to generate video frames.

Figure 6:
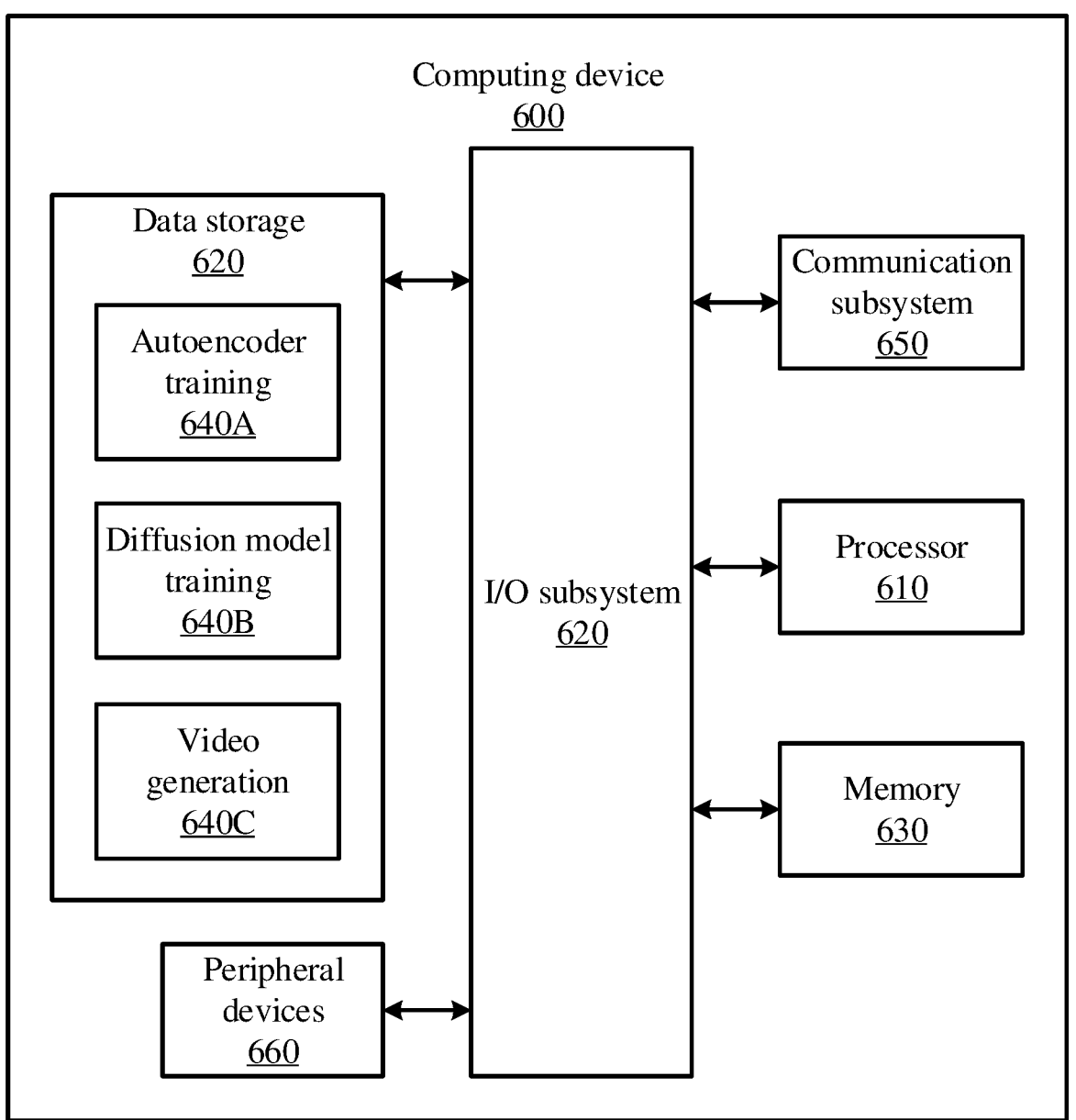
FIG. 6 is a block diagram of a computing device that can train a video generation system and that can generate videos, in accordance with an embodiment of the present invention.

Referring now to FIG. 6, an exemplary computing device 600 is shown, in accordance with an embodiment of the present invention. The computing device 600 is configured to perform named entity recognition.

The computing device 600 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 600 may be embodied as one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for training an autoencoder, 640B for training a diffusion model, and/or 640C for video generation. Any or all of these program code blocks may be included in a given computing system. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

Figure 7:
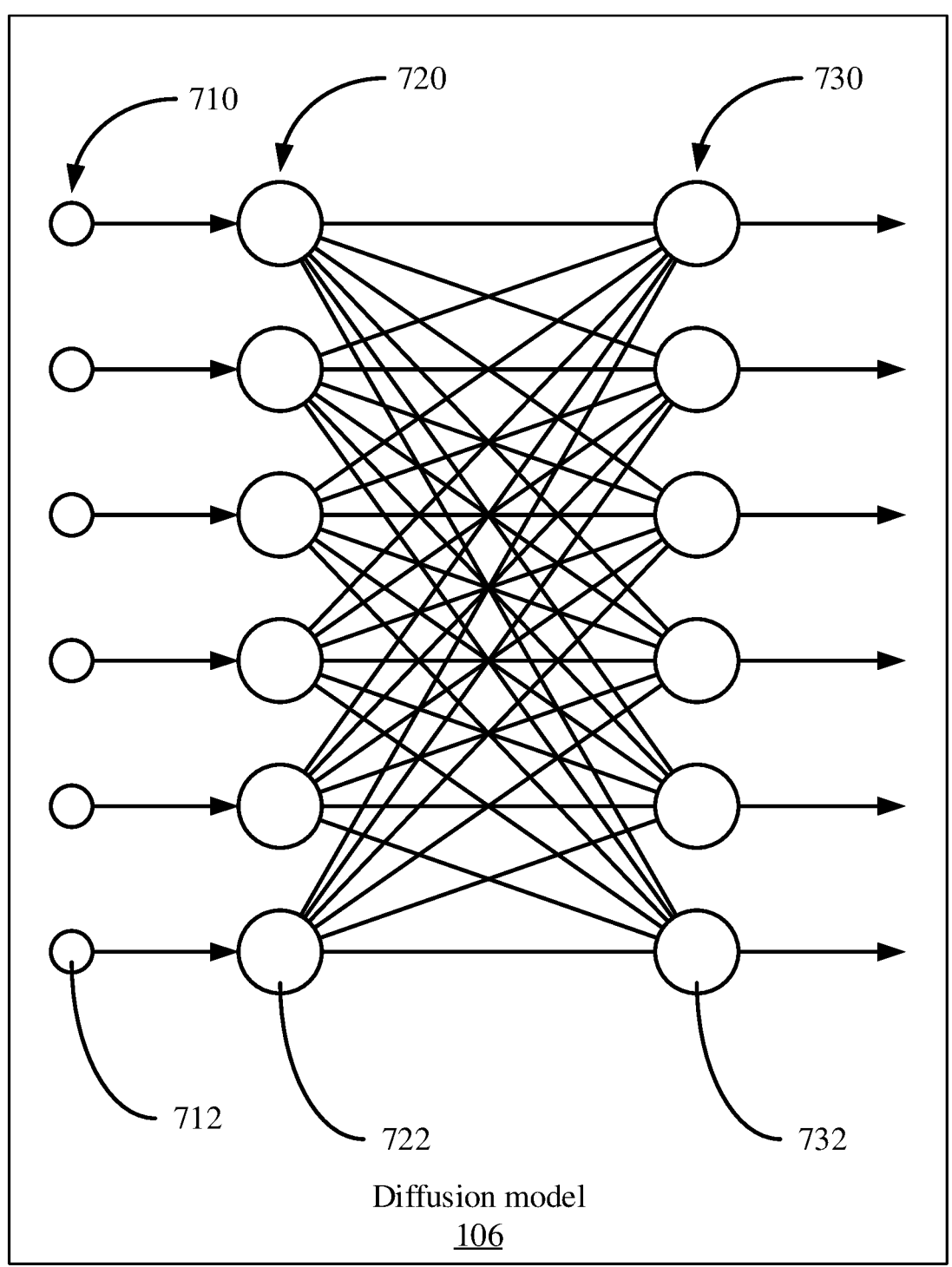
FIG. 7 is a diagram of a neural network architecture that can be used to form part of a diffusion model, in accordance with an embodiment of the present invention.
Figure 8:
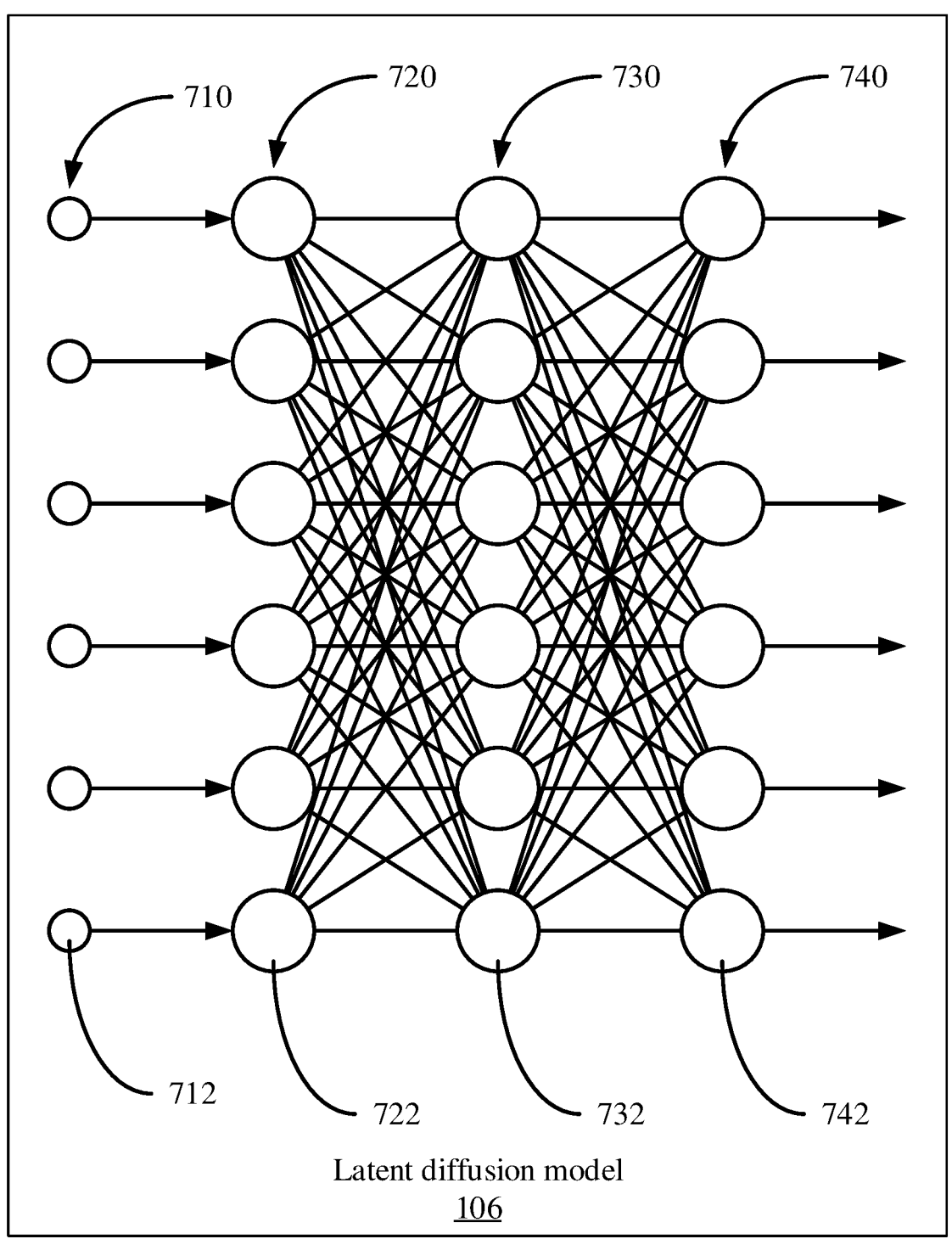
FIG. 8 is a diagram of a deep neural network architecture that can be used to form part of a diffusion model, in accordance with an embodiment of the present invention. s

Referring now to FIGS. 7 and 8, exemplary neural network architectures are shown, which may be used to implement parts of the present models, such as the latent diffusion model 106. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a model, comprising:

training an encoder in an unsupervised fashion to obtain a trained encoder that estimates a backward latent flow between a reference frame and a driving frame taken from a same video including:

warping an encoded reference frame to generate a warped reference frame from an occlusion map and a backward warped map determined based on the backward latent flow and the encoded reference frame;

decoding, with a decoder, visible parts and inpainting occluded parts of the warped reference frame to generate images that match the driving frame to obtain a decoded reference frame; and adjusting parameters of the encoder based on a difference between the reference frame and the decoded reference frame; and training a diffusion model that generates a video sequence responsive to an input image and a text condition, using the trained encoder to determine a latent flow sequence and an occlusion map sequence of a labeled training video.

2. The method of claim 1, wherein training the encoder includes:

encoding an original reference frame from a video using the encoder; and estimating the backward latent flow based on the encoded reference frame and the driving frame.

3. The method of claim 1, wherein training the diffusion model includes generating the latent flow sequence and the occlusion map sequence based on an input image.

4. The method of claim 3, further comprising concatenating the latent flow sequence and the occlusion map sequence to use as input to the diffusion model.

5. The method of claim 3, wherein the occlusion map includes values that indicate a degree of occlusion for respective points in a corresponding latent image embedding.

6. The method of claim 1, wherein training the encoder includes applying the latent flow sequence to an embedding of the input image from the encoder to warp the input image in a latent space, generating a sequence of warped images in the latent space.

7. The method of claim 6, wherein training the encoder includes decoding a warped driving frame and comparing the warped driving frame to the driving frame taken from the video.

8. The method of claim 7, wherein training the encoder includes adjusting parameters of the diffusion model to minimize a reconstruction loss between the driving frame taken from the video and the decoded warped driving frame.

9. The method of claim 8, wherein training the encoder further comprising minimizing the reconstruction loss using unlabeled video frames and a perceptual loss based on a pretrained visual geometry group (VGG) network.

10. The method of claim 1, wherein the diffusion model is a denoising diffusion probabilistic model.

11. The method of claim 1, wherein training the diffusion model further comprises generating the video sequences by utilizing a denoising model with a null-label-conditioned embedding and a text-conditioned embedding both with Gaussian noise added through time steps and are guided by a guidance scale.

12. A system for training a model, comprising:

a hardware processor; and a memory that stores a computer program which, when executed by the hardware processor, causes the hardware processor to:

train an encoder in an unsupervised fashion to obtain a trained encoder that estimates a backward latent flow between a reference frame and a driving frame taken from a same video including to:

warp an encoded reference frame to generate a warped reference frame from an occlusion map and a backward warped map determined based on the backward latent flow and the encoded reference frame;

decode, with a decoder, visible parts and inpainting occluded parts of the warped reference frame to generate images that match the driving frame to obtain a decoded reference frame; and adjust parameters of the encoder based on a difference between the reference frame and the decoded reference frame; and train a diffusion model that generates a video sequence responsive to an input image and a text condition, using the trained encoder to determine a latent flow sequence and an occlusion map sequence of a labeled training video.

13. The system of claim 12, wherein the computer program further causes the hardware processor to:

encode an original reference frame from a video using the encoder; and estimate the backward latent flow based on the encoded reference frame and the driving frame.

14. The system of claim 12, wherein the computer program further causes the hardware processor to generate the latent flow sequence and the occlusion map sequence based on an input image.

15. The system of claim 14, wherein the computer program further causes the hardware processor to concatenate the latent flow sequence and the occlusion map sequence to use as input to the diffusion model.

16. The system of claim 14, wherein the occlusion map includes values that indicate a degree of occlusion for respective points in a corresponding latent image embedding.

17. The system of claim 12, wherein the computer program further causes the hardware processor to apply the latent flow sequence to an embedding of the input image from the encoder to warp the input image in a latent space, generating a sequence of warped images in the latent space.

18. The system of claim 17, wherein the computer program further causes the hardware processor to decode a warped driving frame and to compare the warped driving frame to the driving frame taken from the video.

19. The system of claim 18, wherein the computer program further causes the hardware processor to adjust parameters of the diffusion model to minimize a reconstruction loss between the driving frame taken from the video and the decoded warped driving frame.

20. The system of claim 12, wherein the diffusion model is a denoising diffusion probabilistic model.

* * * * *